United States Patent [19]
Finke et al.

[11] Patent Number: 5,277,308
[45] Date of Patent: Jan. 11, 1994

[54] TRANSPARENT DISPLAY CASE WITH RESILIENT LONG-LIFE HINGE

[75] Inventors: Malcolm K. Finke, Chicago; Marshall Weinstein, Riverwoods, both of Ill.; Kenneth J. Muderlak, Shorewood, Wis.

[73] Assignee: Specialty Store Services, Inc., Morton Grove, Ill.

[21] Appl. No.: 912,160

[22] Filed: Jul. 10, 1992

[51] Int. Cl.$^5$ .......................................... B65D 85/672
[52] U.S. Cl. ................... 206/45.31; 206/387; 206/1.5
[58] Field of Search ............... 206/45.34, 45.31, 1.5, 206/387, 815, 232

[56] References Cited

U.S. PATENT DOCUMENTS

| | | | |
|---|---|---|---|
| 3,763,994 | 10/1973 | Somers . | |
| 3,828,922 | 8/1974 | Holkestad | 206/1.5 |
| 4,285,429 | 8/1981 | MacTavish | 206/387 |
| 4,303,159 | 12/1981 | Stone et al. | 206/387 |
| 4,365,712 | 12/1982 | Oishi et al. | 206/387 |
| 4,512,470 | 4/1985 | Sieben | 206/387 |
| 4,558,782 | 12/1985 | Iverson et al. | 206/387 |
| 4,561,544 | 12/1985 | Reeve | 206/540 |
| 4,572,369 | 2/1986 | Morris | 206/387 |
| 4,627,534 | 12/1986 | Komiyama et al. | 206/387 |
| 4,678,080 | 7/1987 | Nelson | 206/387 |
| 4,718,547 | 1/1988 | MacTavish | 206/309 |
| 4,733,916 | 3/1988 | Seufert | 229/162 |
| 4,759,442 | 7/1988 | Gregerson et al. | 206/387 |
| 4,784,264 | 11/1988 | Sykes | 206/387 |
| 4,802,601 | 2/1989 | Pijanowski et al. . | |
| 4,805,769 | 2/1989 | Soltis et al. | 206/309 |
| 4,834,238 | 5/1989 | Hehn et al. | 206/387 |
| 4,921,097 | 5/1990 | Finke et al. | 206/387 |
| 4,987,999 | 1/1991 | Hehn | 206/387 |
| 4,988,000 | 1/1991 | Weisburn et al. | 206/387 |
| 5,085,322 | 2/1992 | Lax | 206/387 |
| 5,088,602 | 2/1992 | Heyderman et al. | 206/387 |

FOREIGN PATENT DOCUMENTS

2079726 1/1982 United Kingdom .

Primary Examiner—Steven N. Meyers
Assistant Examiner—Jacob K. Ackun, Jr.
Attorney, Agent, or Firm—Roper & Quigg

[57] ABSTRACT

A display case includes separately formed components: (1) a casing which defines an internal cavity having an open end, and (2) a latching closure device with an integrated living hinge. The two components are made of different plastic materials, wherein the different materials have properties advantageously suited for each component. Preferably, the living hinge and closure device is made of a resilient plastic, while the casing is made of a substantially transparent plastic through which the interior of the casing and its contents can be viewed.

30 Claims, 3 Drawing Sheets

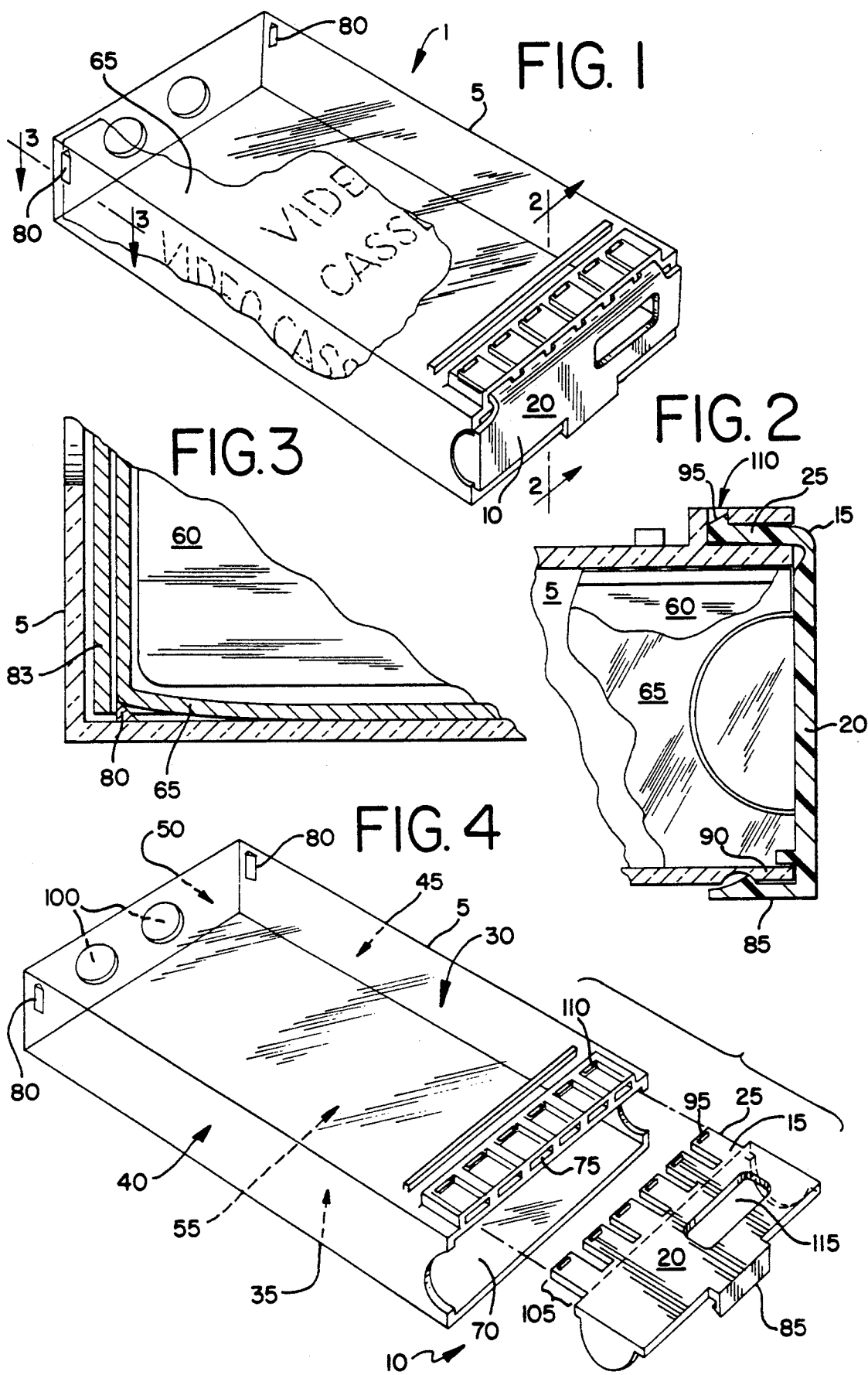

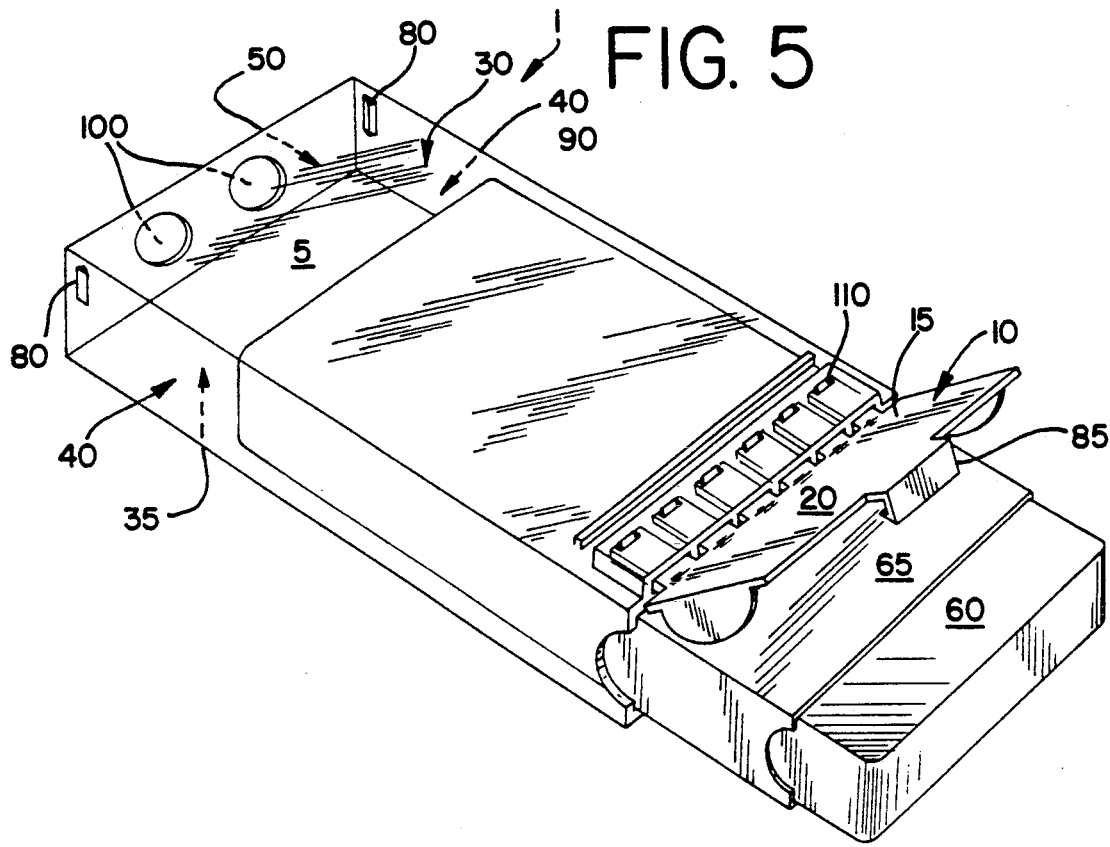
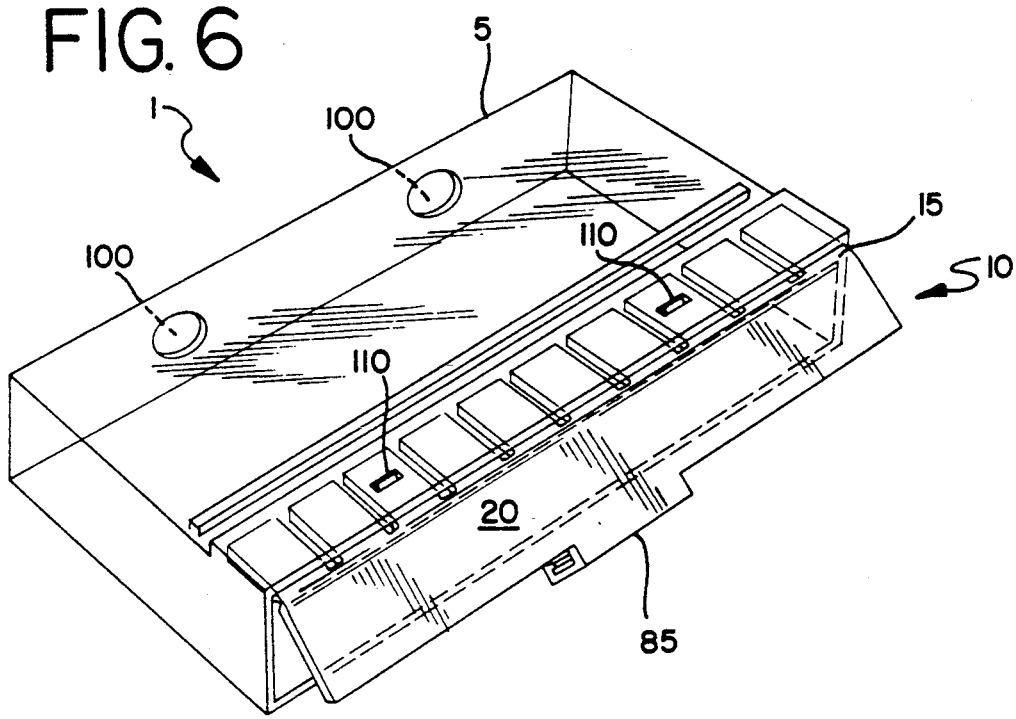

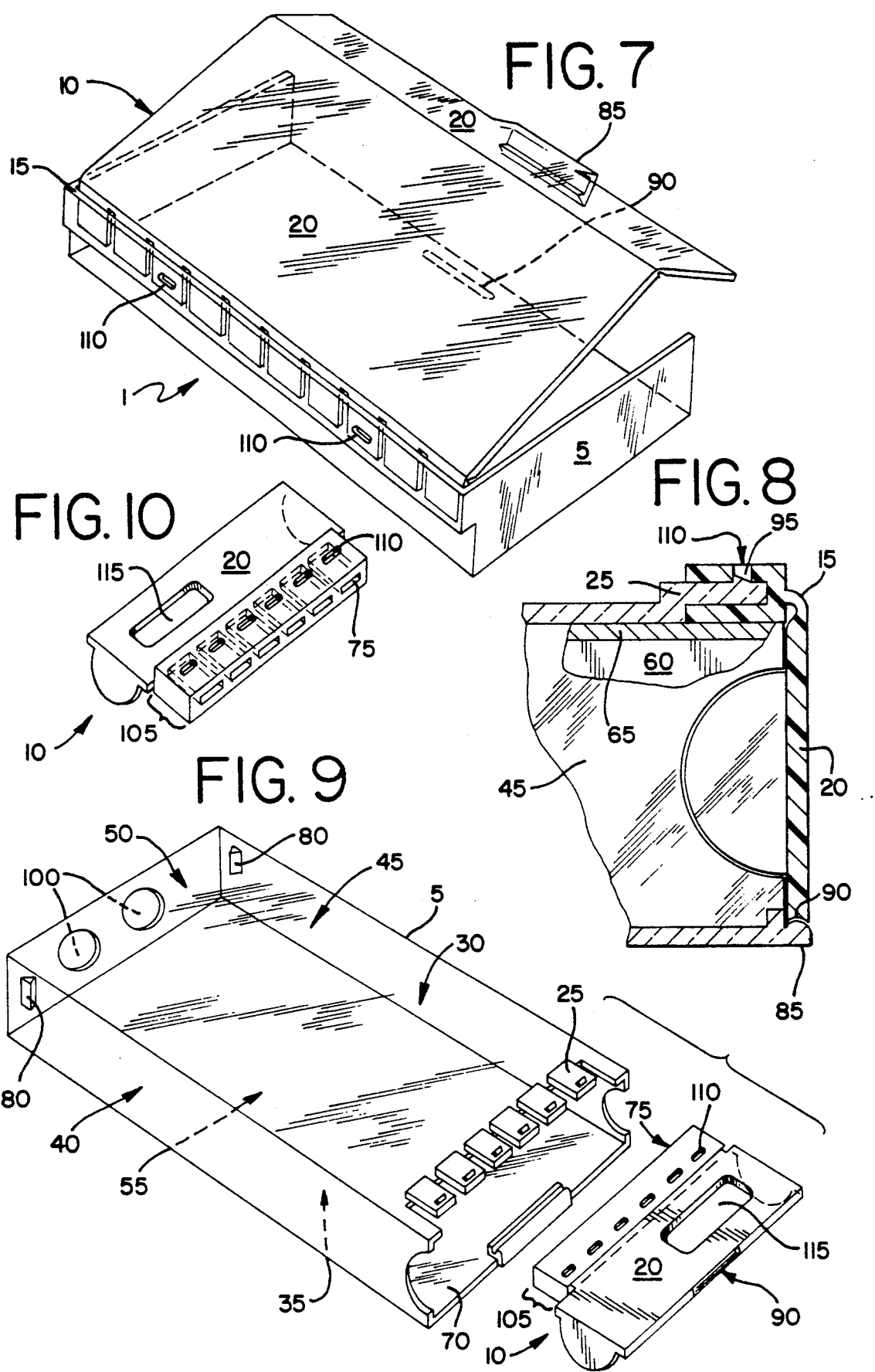

TRANSPARENT DISPLAY CASE WITH RESILIENT LONG-LIFE HINGE

BACKGROUND OF THE INVENTION

1. Field Of The Invention

This invention relates to plastic display cases, and more particularly concerns the advantageous combination of the particular characteristics of different plastic materials for use in constructing the main body and hinged closures of video cassette display cases, respectively. Such video cassette display cases frequently have a casing, as well as a hinged closure device that can be opened for the slidable insertion or withdrawal of a video cassette, and that can be closed for retention of a video cassette inside. The materials for these display cases also can be advantageously combined to enable the customers to view clearly the interior of the case and its contents through the casing, for example, the advertising jackets of prerecorded video cassettes, while other materials can add to the durability of the display case, such as at the hinge area. In certain embodiments particularly adapted for use with video cassettes, the casing is designed such that during the slidable withdrawal of a video cassette, the advertising jacket may be retained inside the display case. Retention of the advertising jacket inside the case helps keep the advertising jacket in good condition.

2. Brief Description Of The Prior Art

Reusable plastic cases have many applications for the storage of various items. When constructed of transparent plastic material, such cases display the contents while also protecting them. Video cassettes and their associated advertising jackets are commonly stored and displayed in such plastic display cases.

Commercial prerecorded video cassettes for rental and sale usually are accompanied by an advertising jacket designed to enhance their marketability. These advertising jackets often are placed on display in public areas of rental shops, stores, or libraries so that customers may browse through the selections. However, extensive handling of a bare advertising jacket may cause it to show the effects of wear, which diminishes a video cassette's resale value and its appeal to customers. Therefore, it is common practice for merchants or libraries to display such video cassettes together with their advertising jackets in individual translucent or transparent plastic display cases so that the printed information on the jacket can be seen by customers while protecting the jackets from handling wear. One such display case design is a plastic sleeve, open at one end of the sleeve, with a closure device mounted adjacent to the open end. The closure device may take the form of a cover which is connected to the case by means of a so-called "living hinge". Such display cases ordinarily are constructed of a single piece and a single type of material such as a single plastic.

There are at least two desirable characteristics for the material from which a video cassette display case is made: (1) transparency, so that the video cassette advertising jacket can be viewed clearly, and (2) resilience, so that the living hinge is durable and resistant to fatigue. Unfortunately, of the plastics commonly available that are economically suited to construction of the display cases, there currently is no single plastic which adequately exhibits both of these qualities. Therefore, either transparency or resilience, or both, are sacrificed in a display case of single-material design.

Among the types of transparent plastic commonly used for single material prior art display cases are (a) polystyrene, and (b) impact modified polymers of styrene, such as polymers of butadiene and styrene, including those currently sold by Phillips Petroleum Company under the trademark K-resin ® (hereinafter collectively referred to as "butadiene-styrene"). These materials are used because their transparent quality allows the inside contents, such as a video cassette advertising jacket, to be seen clearly. However, polystyrene and butadiene-styrene also are relatively brittle in high-frequency living hinge applications. In a commercial environment, such as a video cassette rental business, display cases are likely to be opened and closed quite frequently, for example, during the insertion and removal of video cassettes. A living hinge made of such a material is likely to fatigue to the point of failure at a relatively early point in time, causing the hinged closure panel to fall off. Therefore, single-material polystyrene and butadiene-styrene display cases suffer from a relatively high rate of living hinge breakage, and therefore have a shorter useful life.

The living hinge failure problem can be solved by using a more resilient plastic such as polypropylene or impact modified polypropylene (collectively "polypropylene"), which also are used in single material prior art display cases. This material is more durable in a living hinge application, as it is relatively resistant to fatigue. However, polypropylene is not transparent as is butadiene-styrene or polystyrene; rather, polypropylene is relatively hazy in appearance. The hazy quality of polypropylene impairs a customer's view of the contents inside such a display case, for example, the advertising jacket for a video cassette, making the case less desirable from an aesthetic and marketing point of view.

Accordingly, it is an object of this invention to provide an improved display case that overcomes the aforementioned problems in prior art display cases.

It is a specific object of this invention to provide such a display case having a more durable living hinge on which a closure panel is mounted while simultaneously clearly displaying the interior contents.

It is yet another object of certain embodiments of this invention to provide an economical video cassette display case that clearly displays a video cassette advertising jacket while having a more durable living hinge on which a closure panel is mounted.

It is a further object of this invention to provide a display case that economically utilizes the advantageous properties of two types of plastic.

A still further object of this invention is to provide a display case that protects a cassette advertising jacket from the effects of wear.

It is another object of this invention to provide a display case that retains the advertising jacket in the display case during the insertion and withdrawal of a cassette.

It is a further object of this invention to provide a display case that is relatively inexpensive to manufacture, easy to use, and that conveniently stores a video cassette in its original advertising jacket in an attractive and functional manner.

SUMMARY OF THE INVENTION

The present invention achieves the aforementioned objects and others because it includes several features not found in prior art display cases. In the present invention, the casing is constructed of a relatively transparent plastic, such as polystyrene or butadiene-styrene. The casing defines an internal cavity, typically a hollow, rectangular, substantially parallelepiped shape with at least one end left open. The transparent quality of the casing allows the contents to be seen clearly.

In an embodiment of the invention adapted to the storage of a video cassette, the casing is designed so that printed material, such as an advertising jacket, containing an accompanying video cassette, can fit within the internal cavity. The video cassette can be slidably inserted and withdrawn through the open end of the casing.

The present invention further includes a closure device as a separate component. The closure device is a single piece of resilient plastic, such as polypropylene, comprising a closure panel pivotally connected to an adjacent appendage. The appendage provides a means of attaching the closure panel to the casing, and may include a tab or set of tabs. The pivotal connection may be a living hinge disposed along the edge of the closure panel adjacent to the appendage.

The tabs attach to the casing at a position proximate to its open end by an attachment means such as a permanent or semi-permanent snap fit into associated slots on the casing. Other permanent or semi-permanent attachment means, including but not limited to heat sealing, gluing, sonic welding, screws, staples, or rivets may be used as well. This means of attachment positions the closure panel such that it can operate between open and closed positions at the open end of the casing by means of the living hinge.

The closure panel may be secured in the closed position by a latching means. This latching means may be a snap-fit between a lipped extension of the closure panel and a ridge on the casing.

In connection with an embodiment of the invention wherein the display case is provided for a video cassette with its printed jacket, within the internal cavity of the casing there may be included an internally projecting protrusion which engages the advertising jacket, but not the video cassette. In this embodiment, the engagement referenced above allows the slidable withdrawal of the cassette through the open end while impeding the withdrawal of the advertising jacket within the transparent casing. The casing protects the advertising jacket from wear.

BRIEF DESCRIPTION OF THE DRAWINGS

For a more complete understanding of this invention, reference now should be made to the embodiment illustrated in greater detail in the accompanying drawings and described by way of example only. In the drawings:

FIG. 1 is a perspective view of a fully assembled display case, the tabs of the closure device having been inserted into the slots of the casing and the closure panel being latched in a closed position, the casing being illustrated in a cut-away view to show a video cassette advertising jacket within.

FIG. 2 is a fragmentary side view of the casing and closure device with the closure panel in the closed position, the casing being partially cut away along section 2—2 to show the relationship of the tabs to the slotted casing and the latching means.

FIG. 3 is a fragmentary frontal view of an upper corner of the casing as viewed along section 3—3, showing an internally projecting protrusion in engagement with a video cassette advertising jacket.

FIG. 4 is an exploded perspective view of an unassembled display case.

FIG. 5 is a perspective view of an assembled display case with the closure panel open, an advertising jacket partially inserted into the display case, and a video cassette partially inserted into the advertising jacket.

FIG. 6 is a perspective view of an alternative embodiment wherein the open end of the casing and the closure panel have been relocated to a lateral edge of the casing.

FIG. 7 is a perspective view of an alternative embodiment wherein the closure device comprises multiple panels.

FIG. 8 is a fragmentary side view of an alternative embodiment of the casing and closure device with the closure panel in the closed position, the casing being partially cut away to show the relationship of tabs on the casing engaged with a slotted appendage, also showing the relationship between a lipped extension on the casing adjacent to its open end and an associated ridge on the closure device.

FIG. 9 is an exploded perspective view of an unassembled display case having an alternatively configured latching means and an alternatively configured attachment means showing tabs extending from the casing and slots in the appendage of the closure device for engagement with the tabs, and showing a lipped extension from said casing and an associated ridge along an edge of the closure panel.

FIG. 10 is a perspective view of an alternative embodiment of the closure device having a slotted appendage and a ridge on the closure panel.

DETAILED DESCRIPTION

While the particular display case illustrated in FIGS. 1 through 7 and described below is useful for containment and display of video cassettes in their advertising jackets, it will be recognized by those skilled in the art that by altering the dimensions or shapes of the components, display cases according to the present invention that are useful for containment and display of other objects may be made as well.

A display case 1 according to the present invention can be seen in FIG. 1. Among its components are a casing 5 and an attachable closure device 10 which incorporates a living hinge 15. Because the display case 1 is not formed of a single component, but rather has separately formed components, different materials may be used having properties best suited for the demands of each component as described herein.

The plastic closure device 10 comprises a closure panel 20 and adjacent appendage 105. A living hinge 15 is disposed along the line of connection between the closure panel 20 and the appendage 105. The appendage 105 comprises one or more tabs 25.

The casing 5 is a hollow, rectangular, substantially parallelepiped shape, having at least one open end 70 to the interior cavity 55, and, in the illustrated embodiment, includes two opposed side walls 30 and 35, two opposed edge walls 40 and 45, and a single end wall 50. Preferably these walls are made of a substantially transparent plastic material and define an interior cavity 55. In the illustrated embodiment, the interior cavity 55 is designed to be of sufficient shape and size to receive a video cassette 60 and associated advertising jacket 65. The casing provides an open end 70 that permits the slidable insertion of a video cassette 60 in its associated advertising jacket 65, and the withdrawal of a video cassette 60 in a predetermined direction.

The appendage 105 is attachable to the casing 5. One means of attachment consists of one or more slots 75 in the casing 5 adjacent to the opening which is associated with and receives the tab or tabs 25 to engage the casing in a permanent or semi-permanent connection. The tabs 25 are attached to the appendage 105. This permanent or semi-permanent connection between the casing 5 and the appendage 105 may be a snap-fit caused by the engagement of a ramped ridge 95 on each tab 25 with a recess 110. The recesses 110 are located within the slots 75 associated with the corresponding tabs 25 having such a ramped ridge 95. When the tabs 25 and ramped ridges 95 are securely fitted into the slots 75 and recesses 110, respectively, the living hinge 15 allows the closure panel 20 to pivot along the axis of the hinge between open and closed positions.

When the closure panel 20 is in the open position, a video cassette 60 and advertising jacket 65 can be slidably inserted into the internal cavity 55. In the preferred embodiment of a video cassette display case, internally projecting protrusions 80 engage with an inserted advertising jacket 65, retaining it within the transparent casing 5 so that it might be viewed by a customer, yet remain protected from wear. However, the protrusions 80 do not interfere with the slidable withdrawal of a video cassette 60. A cassette 60 can be withdrawn in a predetermined direction through the open end 70 while removal of the advertising jacket 65 is impeded by the protrusions 80 of the casing 5.

In the preferred embodiment, the protrusions 80 are inclined toward the interior of the cavity 55, the inclination increasing as one views the protrusions 80 from the direction of the open end 70 toward the end wall 50, and are of a sufficient dimension to engage the advertising jacket, but not the video cassette 60 itself. The advertising jacket 65 can be inserted readily into the casing 5, as the surface of the advertising jacket 65 slides along the protrusions 80 in the direction of the increasing incline until the advertising jacket 65 engages the edges of the protrusions 80. To withdraw the advertising jacket 65 from the casing 5, the advertising jacket 65 must slide in the direction opposite the incline direction. The engagement between the protrusions 80 and the top panel 83 of the advertising jacket 65 resists the slidable withdrawal of the advertising jacket 65, such that a greater force is required to withdraw the advertising jacket 65 than to insert it. One skilled in the art will recognize that the protrusions may take alternate embodiments; for example, a ridge or lip on the lower interior of the casing 5 of such a dimension as to impede withdrawal of the advertising jacket 65 while simultaneously allowing withdrawal of the video cassette 60. Similarly, the protrusions may take the form of a friction or interference fit wherein withdrawal of the advertising jacket 65 is impeded by the friction or interference fit, however, the video cassette 60 simultaneously may be withdrawn.

The advertising jacket 65 may be disengaged and slidably withdrawn through the open end 70 by forcing it past the edges of the protrusions 80 by pushing it from the finger holes 100 in the direction of the open end 70 with a force sufficient to disengage the advertising jacket 65 from the edges of protrusions 80.

The closure panel 20 may be secured in the closed position by a latching means. The latching means may constitute a transversely directed lipped extension 85 of the closure panel 20 on the portion of the closure panel opposite the tabs 25, and an associated ledge 90 on the outer edge of the casing on the wall 40 opposite the slots 75. The lipped extension 85 engages the ledge 90 to effect a snap-fit whereby the closure panel 20 is latched in the closed position for retaining a cassette 60 inside the display case. Disengagement of the lipped extension 85 and the ledge 90 unlatches the closure panel 20 such that it can be opened for the slidable removal or insertion of a video cassette 60.

Because it is desirable for the display case contents to be clearly visible, the casing 5 preferably is constructed of transparent plastic such as polystyrene or butadiene-styrene. However, the closure device 10, which incorporates a living hinge 15, preferably is constructed of a more resilient material which can survive repeated bending. Polystyrene and butadiene-styrene have been found to be less than ideal for living hinge demands because these materials fatigue and break at a relatively early stage from repeated bending. Therefore, the closure device 10 preferably is formed from a more resilient plastic such as polypropylene, which is more durable for a living hinge 15 because it is relatively fatigue resistant and more readily survives repeated bending. Furthermore, the latching means is easier to operate when the closure piece is constructed of a more resilient plastic such as polypropylene, because flexing of the lipped extension 85 is necessary to engage and disengage the ledge 90.

The closure device 10 also may be molded from various colors of resilient plastic. This may provide an improved appearance and increase marketing appeal. Different colors also may be used for ready identification of the category of the contents. For example, merchants may color-code video cassette display cases for ready identification of the category of movie (e.g., blue for musicals, red for horror films, etc.). Also the closure device may be replaceable by means of a semi-permanent connection of appendage 105 to the casing 5. A semi-permanent connection allows easy replacement of the closure device 10 if it becomes damaged by living hinge failure, or if a user wishes to replace the closure device 10 with another one of a different color.

Those skilled in the art will recognize that plastics or resinous materials (collectively "plastics") other than polystyrene, butadiene-styrene, or polypropylene also may be used in connection with this invention.

The closure panel preferably has a cutout 115. The cutout 115 provides an unobstructed path for optical communication, allowing, for example, a UPC symbol on the video cassette 60 to be scanned without the opening of the closure panel 20.

From the above description, it is apparent that the objects of the present invention have been achieved. While only certain embodiments have been set forth, alternative embodiments and various modifications will be apparent from the above description to those skilled in the art.

For example, the means of attaching the tabs 25 to the casing 5 could be by heat sealing, sonic welding, rivets, glue, screws, staples, or other permanent or semi-permanent attachment means, rather than a snap-fit.

In another alternative embodiment, shown in FIG. 6, the open end of the casing and closure panel may be relocated at another side or edge of the display case, rather than at the location shown in FIG. 1.

Another alternative embodiment, shown in FIGS. 8-10, has an attachment means with at least one tab extending from the casing and having an associated slot or slots in the appendage of the closure device.

Similarly, an alternative embodiment of the latching means, shown also in FIGS. 8–10, has a lipped extension from the casing and an associated ridge on the closure panel.

In yet another alternative embodiment, the closure device may comprise not one, but multiple panels, such as shown in FIG. 7. The preferred embodiment described above and shown in FIG. 1 has only one closure panel that acts as a wall of the display case structure when the closure device is latched closed. Similarly, in a multiple panel embodiment, the multiple panels each function as a wall of the display case when the closure device is latched.

These and other alternatives are considered equivalents and within the spirit and scope of the claimed invention.

What is claimed is:

1. A display case comprising:
   (a) a casing constructed of a first plastic material which defines an internal cavity and having an open end; and
   (b) a closure device constructed of a second plastic material different from the fist plastic material, having a closure panel and an appendage secured to the closure panel which is pivotal in relation to the closure panel by means of a living hinge, whereby an attachment means for attaching said closure device to said casing proximal to said open end secures said appendage in a position proximal to said open end such that said closure panel can open and close in relation to said open end by pivoting upon said living hinge.

2. A display case according to claim 1 further comprising a latching means for latching said closure panel in a closed position.

3. A display case according to claim 1 wherein the first plastic material is a substantially transparent plastic.

4. A display case according to claim 1 wherein said second plastic material is a substantially resilient plastic.

5. A display case according to claim 1 wherein said first plastic material is a substantially transparent plastic and said second plastic material is a resilient plastic.

6. A display case according to claim 1 wherein said attachment means is a semi-permanent snap-fit such that said closure device is replaceable.

7. A display case according to claim 1 wherein said closure device is constructed of a colored plastic.

8. A display case according to claim 1 wherein said first plastic material is polystyrene.

9. A display case according to claim 1 wherein said first plastic material is a butadiene-styrene polymer.

10. A display case according to claim 1 wherein said second plastic material is polypropylene.

11. A display case according to claim 1 wherein said first plastic material is selected from a group consisting of polystyrene and butadiene-styrene, and said second plastic material is polypropylene.

12. A display case according to claim 2 wherein said latching means comprises:
   (a) an extension on said closure panel;
   (b) a lip on said extension; and,
   (c) an associated ridge on the outer wall of said casing adjacent to said open end;
   whereby the engagement of said lip and said ridge latches the closure panel in a closed position.

13. A display case according to claim 2 wherein said latching means comprises:
   (a) an extension of said casing adjacent to said open end;
   (b) a lip on said extension; and,
   (c) an associated ridge on the closure panel;
   whereby the engagement of said lip and said ridge latches the closure panel in a closed position.

14. A display case according to claim 1 wherein said attachment means comprises:
   (a) at least one slot formed in said casing; and,
   (b) at least one tab extending from said appendage wherein said tab is engageable with said slot.

15. A display case according to claim 1 wherein said attachment means comprises:
   (a) at least one slot formed in said appendage to said closure device; and,
   (b) at least one tab extending from said casing engageable with said slot.

16. A display case according to claim 5 wherein said internal cavity is of a size and shape such that it is adapted to receive a video cassette within its advertising jacket.

17. A display case according to claim 16 wherein said casing has at least one inwardly projecting protrusion which engages with an inserted advertising jacket such that said engagement impedes the withdrawal of said advertising jacket while simultaneously allowing slidable withdrawal of said video cassette.

18. A display case according to claim 1 wherein said attachment means is a mechanical connection.

19. A display case according to claim 18 wherein said mechanical connection is a connection selected from the group consisting of permanent snap fit, semi-permanent snap fit, heat sealing, gluing, sonic welding, screws, staples and rivets.

20. A display case adapted for the storage of a video cassette, comprising:
   (a) a casing formed of a first plastic material defining a hollow interior cavity sufficient in size and shape to receive a video cassette in a advertising jacket, wherein said casing has an open end;
   (b) a closure device constructed of a second plastic material different from the first plastic material said closure device being separately fabricated from said casing and being separate from said casing prior to attachment thereto, said closure device having a closure panel and an appendage, a living hinge disposed along a side of the closure panel, wherein said living hinge provides a pivotal connection of said closure panel to said appendage, with said appendage being attachable to said casing in a predetermined position proximal to said open end, thereby providing a pivotal connection of said closure panel to said casing when said closure panel is attached to said casing such that said closure panel can pivot along the axis of the living hinge between open and closed positions relative to said open end; and
   (c) a latching means for securing said closure panel in said closed position.

21. A video display case according to claim 20 wherein said first plastic material is selected from a group consisting of polystyrene and butadiene-styrene, and said second plastic material is polypropylene.

22. A video cassette display case according to claim 21 wherein said casing has at least one internally projecting protrusion within said hollow interior cavity such that said protrusion engages said advertising jacket but does not engage said video such that said video cassette may be withdrawn from said casing while said protrusion simultaneously impedes the withdrawal of said advertising jacket.

23. A video cassette display case according to claim 22 further comprising disengaging means for disengaging said advertising jacket from said protrusion, wherein said disengaging means comprises at least one hole in the end opposite to said open end permitting an implement to be inserted to forcibly disengage said jacket from said protrusion.

24. A video cassette display case according to claim 20 wherein said appendage is attachable to said casing in a semi-permanent snap-fit manner such that said closure device is replaceable.

25. A video cassette display case according to claim 20 wherein said closure device is constructed of a colored plastic.

26. A display case comprising:
(a) a casing constructed of a first plastic material which defines an internal cavity and having an open end; and
(b) a closure device constructed of a second plastic material different from the first plastic material, said closure device comprising a closure panel, an appendage secured to said closure panel which is pivotal in relation to said closure panel by means of a living hinge, and attachment means for detachably securing said appendage to said casing for the removal and replacement of said closure device, said closure device being attachable to said casing in a position proximal to said open end such that when attached to said casing said closure panel can open and close in relation to said open end by pivoting upon said living hinge.

27. A display case according to claim 26 further comprising a latching means for latching said closure panel in a closed position.

28. A display case according to claim 26 wherein said attachment means is a snap-fit.

29. A display case according to claim 26 wherein said first plastic material is a substantially transparent plastic.

30. A display case according to claim 20 wherein said second plastic material is a substantially resilient plastic.

* * * * *